United States Patent [19]

Nunn

[11] Patent Number: 5,190,326

[45] Date of Patent: Mar. 2, 1993

[54] CAT LITTER BOX CLEANER

[76] Inventor: Gary L. Nunn, Rt. 1 Box 190A, Prospect, Tenn. 38477

[21] Appl. No.: 756,592

[22] Filed: Sep. 9, 1991

[51] Int. Cl.⁵ .............................................. A01K 29/00
[52] U.S. Cl. ..................................... 294/1.3; 294/55; 15/257.6
[58] Field of Search ................. 294/1.3, 49, 55, 59, 294/60, 56; 209/417, 418, 419; 15/257.1, 257.3, 257.4, 257.6, 257.9

[56] References Cited

U.S. PATENT DOCUMENTS

| | | | |
|---|---|---|---|
| 3,827,098 | 8/1974 | Sanderson | 15/257.4 X |
| 3,986,744 | 10/1976 | Krogstad et al. | 294/1.3 |
| 4,019,768 | 4/1977 | Niece | 294/1.3 |
| 4,185,355 | 1/1980 | Williams | 294/1.3 X |
| 4,316,627 | 2/1982 | Solypa | 294/55 X |
| 4,948,266 | 8/1990 | Bencic | 294/1.3 X |

*Primary Examiner*—Charles A. Marmor
*Assistant Examiner*—Joseph D. Pape

[57] ABSTRACT

A cat litter box cleaner utilizes a slotted litter shovel on the end of a hand held container. The container includes a spring loaded door which permits a user to scoop up cat litter, shake the litter through the slots in the shovel, and then depress a button which releases the door so as to allow fecal material to fall into the container. A disposable plastic bag is retained within the container so as to facilitate the disposal of the waste material. The container is removable from the scoop head for purposes of removing the bag. When a bag is not used, a battery powered fan drier can be utilized to remove moisture from the fecal material before disposal.

6 Claims, 4 Drawing Sheets

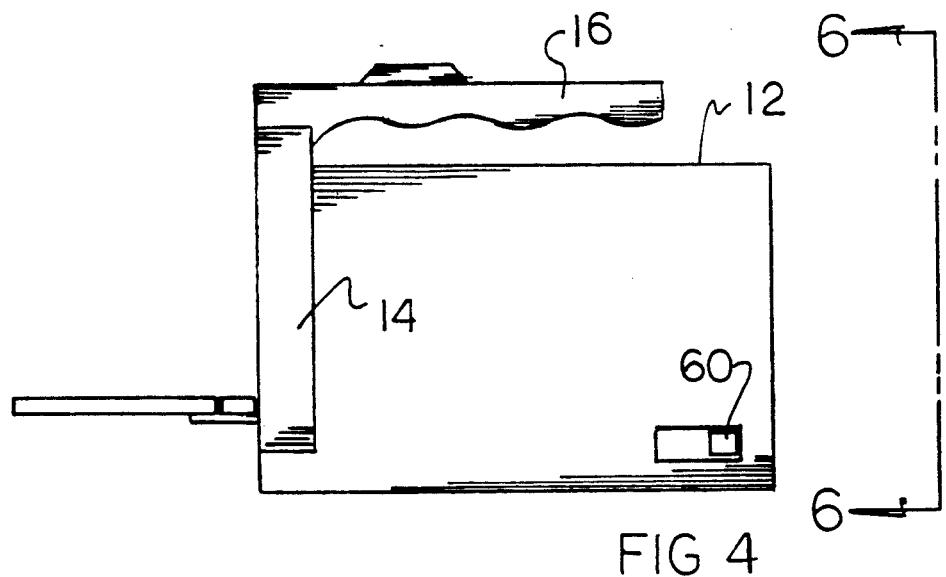
FIG 4
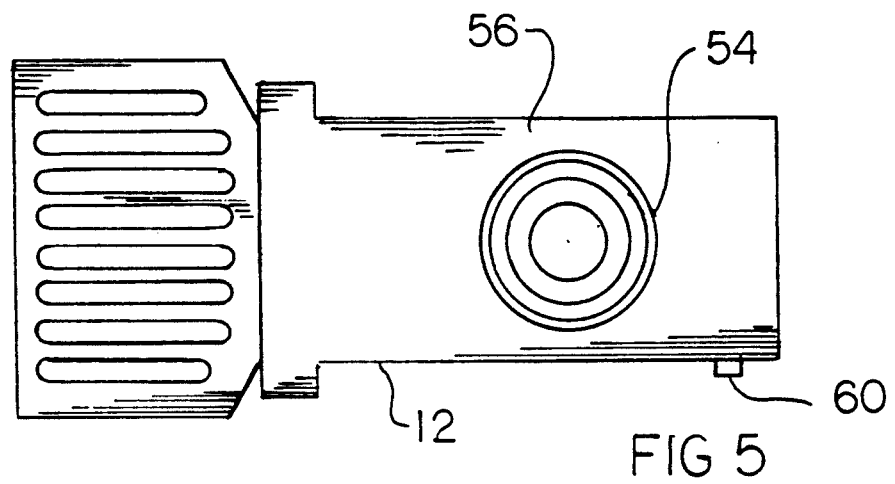
FIG 5
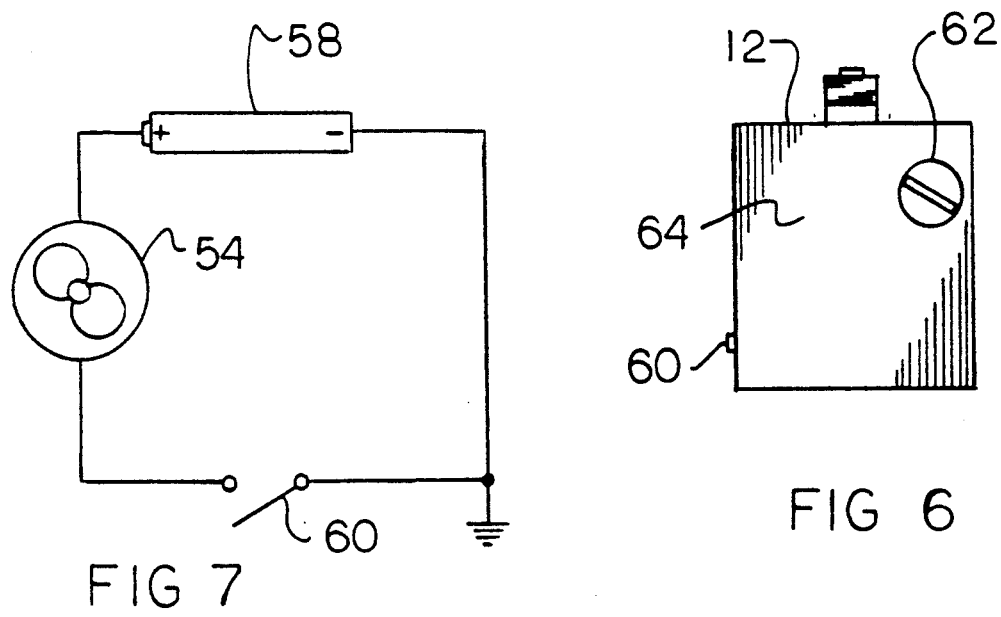
FIG 7
FIG 6

CAT LITTER BOX CLEANER

BACKGROUND OF THE INVENTION

1. Field of the Invention

The present invention relates to cat litter boxes and more particularly pertains to the screening and disposal of fecal matter from cat litter.

2. Description of the Prior Art

The use of fecal removing screens in cat litter boxes is well known in the prior art. For example, U.S. Pat. No. 2,963,003, which issued to Oberg et al. on Dec. 6, 1960, discloses an indoor pet sand box which includes a separator or sieve comprising a frame with handles and an openwork material positioned within the frame. The openwork material allows sand to drop into the sand box while retaining fecal matter for the purposes of disposal. Similarly, U.S. Pat. No. 4,802,442, which issued to M. Wilson on Feb. 7, 1989, discloses a cat litter screening device which utilizes a mesh material attached to handles wherein such mesh is of a size which allows litter to drop therethrough while capturing the fecal material to be disposed of U.S. Pat. No. 4,817,560, which issued to Prince et al. on Apr. 4, 1989, discloses a further litter box sifter wherein the sifter element is in the form of a basket whereby litter may be sifted through the basket while the retention of fecal material for disposal is made possible.

As can be appreciated, the above-described prior art devices are functional for their intended purposes; however, all of these prior art devices are designed to be permanently mounted within a pet litter box and do not provide a simple means for collecting and disposing of the fecal matter once the same has been captured within a sieve structure. Further, these prior art devices are large and bulky and must be permanently mounted within a litter box. Accordingly, there would appear to exist a need for new and improved fecal matter removing devices which could more easily and efficiently accomplish the function of removing fecal matter from a litter container and in this regard, the present invention substantially fulfills this need.

SUMMARY OF THE INVENTION

In view of the foregoing disadvantages inherent in the known types of litter box cleaners now present in the prior art, the present invention provides an improved litter box cleaner construction wherein the same can be utilized to remove and package fecal matter in an easy and efficient manner. As such, the general purpose of the present invention, which will be described subsequently in greater detail, is to provide a new and improved cat litter box cleaner which has all the advantages of the prior art cat litter box cleaners and none of the disadvantages.

To attain this, the present invention essentially comprises a cat litter box cleaner which utilizes a slotted litter shovel on the end of a hand held container. The container includes a spring loaded door which permits a user to scoop up cat litter, shake the litter through the slots in the shovel, and then depress a button which releases the door so as to allow fecal material to fall into the container. A disposable plastic bag is retained within the container so as to facilitate the disposal of the waste material. The container is removable from the scoop head for purposes of removing the bag. When a bag is not used, a battery powered fan drier can be utilized to remove moisture from the fecal material before disposal.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cat litter box cleaner which has all the advantages of the prior art cat litter box cleaners and none of the disadvantages.

It is another object of the present invention to provide a new and improved cat litter box cleaner which may be easily and efficiently manufactured and marketed.

It is a further object of the present invention to provide a new and improved cat litter box cleaner which is of a durable and reliable construction.

An even further object of the present invention is to provide a new and improved cat litter box cleaner which is susceptible of a low cost of manufacture with regard to both materials and labor, and which accordingly is then susceptible of low prices of sale to the consuming public, thereby making such cat litter box cleaners economically available to the buying public.

Still yet another object of the present invention is to provide a new and improved cat litter box cleaner which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side elevation view of a second embodiment of the invention.

FIG. 5 is a top plan view of the second embodiment.

FIG. 6 is an end elevation view of the invention as viewed along the line 6—6 in FIG. 4.

FIG. 7 is a circuit diagram applicable to the second embodiment of the invention.

DESCRIPTION OF THE PREFERRED EMBODIMENTS

Figure 1:
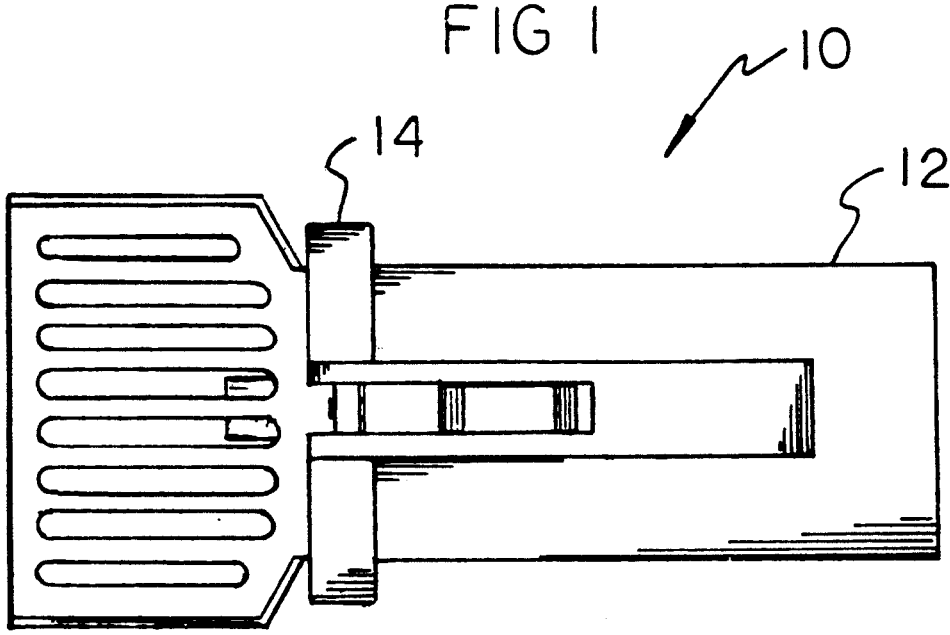
FIG. 1 is a top plan view of the cat litter box cleaner comprising the present invention.
Figure 2:
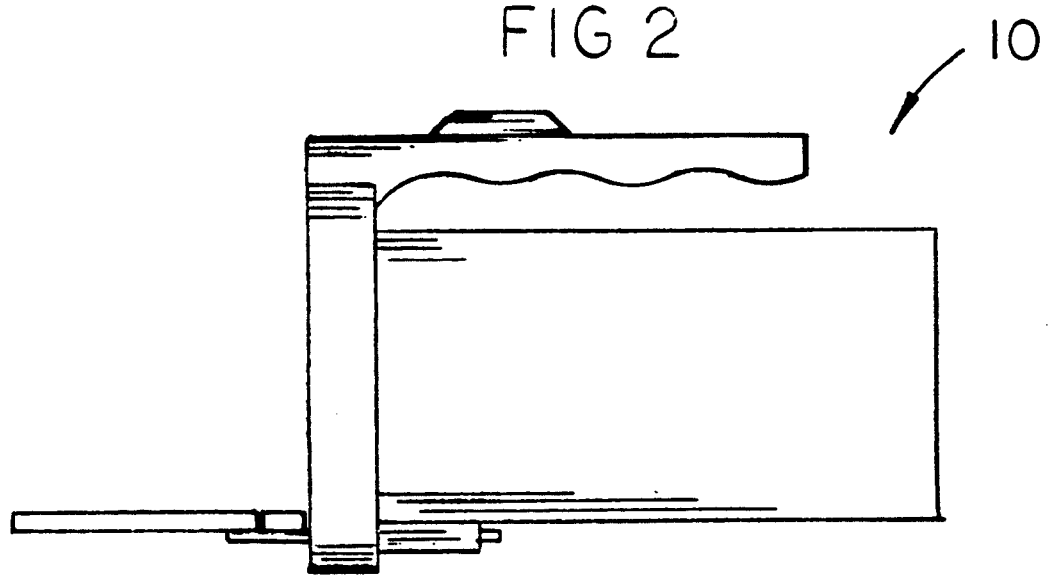
FIG. 2 is a side elevation view of the invention.
Figure 3:
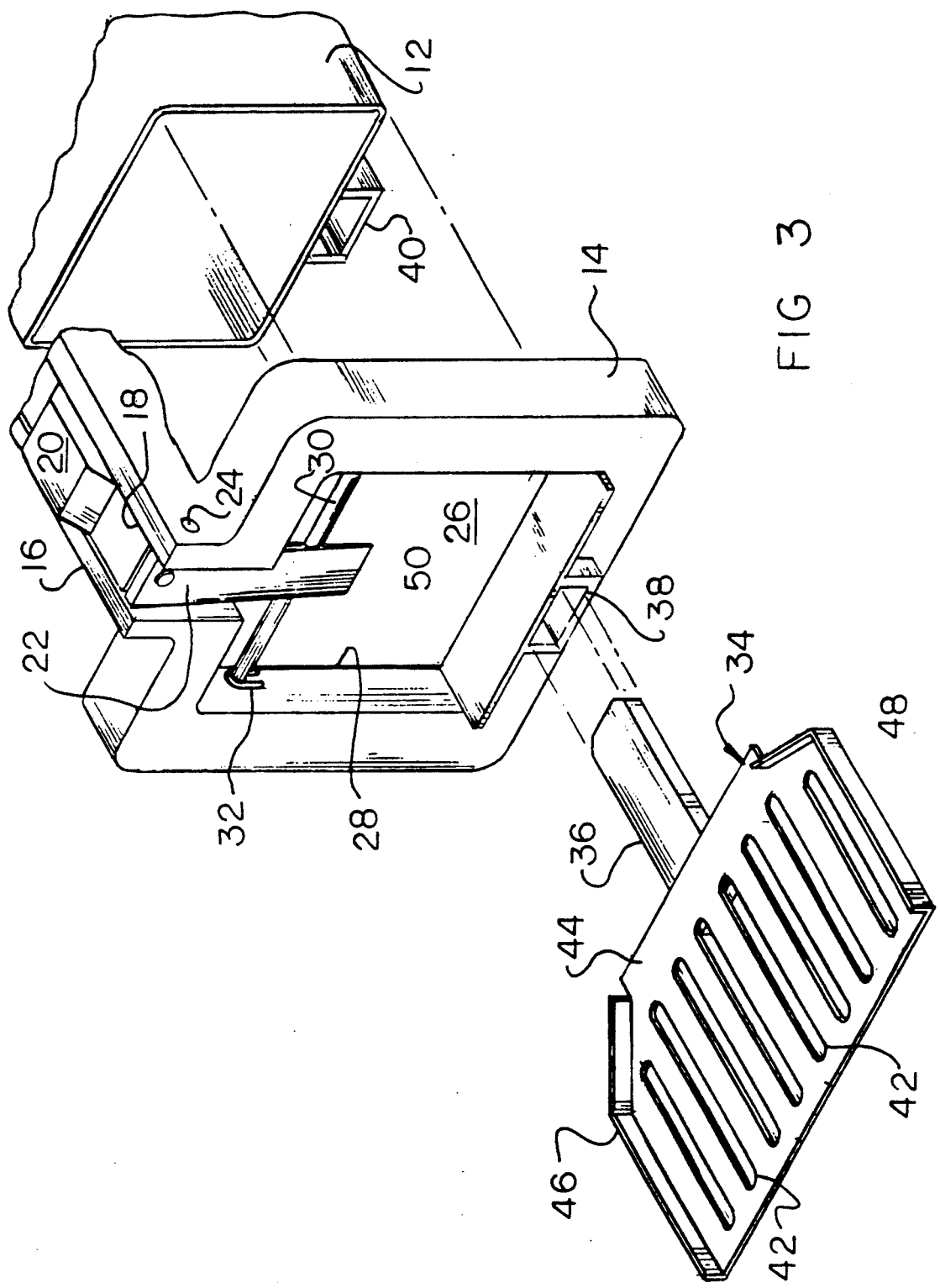
FIG. 3 is a partial perspective view of the invention showing the same in a disassembled form.
Figure 8:
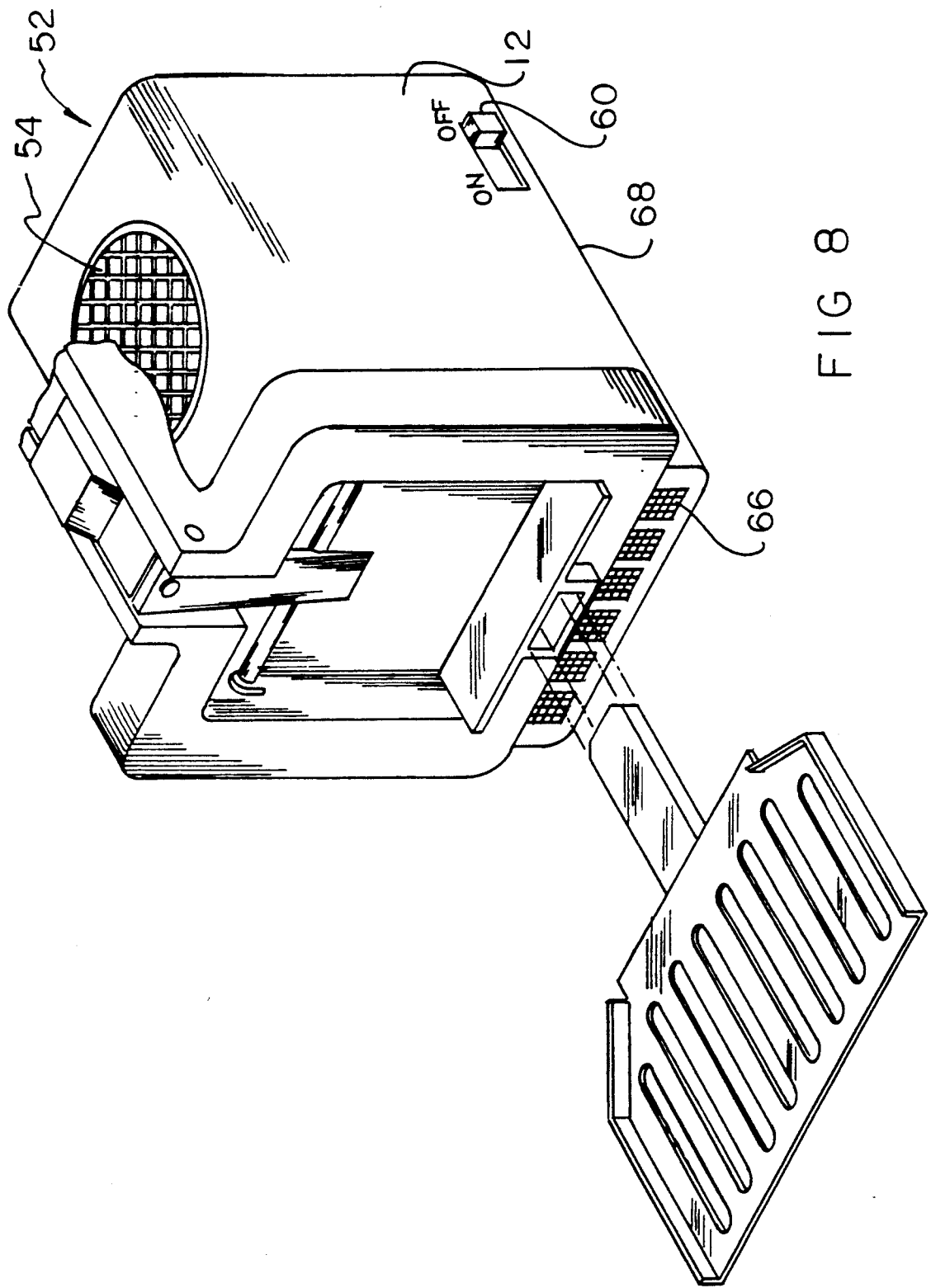
FIG. 8 is a perspective view of the second embodiment of the invention showing the same in a partially disassembled form.

With reference now to the drawings, and in particular to FIGS. 1-3 thereof, a new and improved cat box litter cleaner embodying the principles and concepts of the present invention and generally designated by the reference numeral 10 will be described.

More specifically, it will be noted that the cat box litter cleaner 10 essentially comprises a removable container or housing 12 attached to a rectangularly shaped retention ring 14 by any conventional means. In this regard, it is envisioned that the container 12 will be designed to hold an unillustrated plastic bag to facilitate the disposal of fecal matter and will be removably press fitted into a groove formed in the retention ring 14.

The retention ring 14 is provided with an integral handle structure 16 having a button guide slot 18 formed therein. A slidable push button 20 is positionable within the slot 18 and is selectively abuttable against a pivot arm 22 which is pivotally attached to the handle 16 by a pivot shaft 24. A spring loaded door 26 is pivotally attached within the central opening 28 of the retention ring 14, with such door being attached to the retention ring 14 by a rotatable shaft 30. A spring member 32 is attached between the retention ring 14 and the door 26 to hold the door in a normally closed position.

A shovel or scoop 34 can be of either a planar or curved construction, and is removably attachable to the retention ring 14 through the use of an extended arm 36. The arm 36 is engagable with an integral slot 38 formed in and extending through the retention ring 14, with the arm further extending into a holding slot 40 integrally formed as a part of the container 12. A frictional grip is all that is required to hold the arm 36 within the combined slots 38, 40, whereby an easy removal of the scoop 34 is afforded simply by pulling the same away from the retention ring 14.

While all shapes and sizes of a shovel 34 are envisioned to be encompassed by the present invention, it can be seen that the embodiment illustrated in FIG. 3 includes a plurality of through-extending slots 42 which are aligned across the planar surface 44 of the scoop 34, and side edges 46, 48 are designed to extend upwardly to more effectively hold and guide a quantity of cat litter on the shovel.

With respect to the manner of operation of this first embodiment of the invention as shown in FIGS. 1-3, it can be appreciated that when the cat box litter cleaner 10 is in its assembled form as shown in FIG. 1, a user can lift a quantity of cat litter from a litter box by means of the shovel 34. Through a gentle shaking of the cleaner 10, litter will drop through the plurality of slots 42 and fecal matter will be retained on the shovel 34. By pointing the cleaner 10 upwardly, the fecal matter will drop downwardly onto the spring loaded door 26, and a user can then move the button 20 forwardly so as to cause the arm 22 to pivot around its pivot shaft 24. A bottom end portion 50 of the arm 22 will press against the door 26 so as to pivot it inwardly into the container 12, thus allowing the fecal matter to drop into the container in a now apparent matter. If a disposable plastic bag is used to capture the fecal matter, it can be later removed from the container 12 and disposed of without any soiling of the cleaner 10.

FIGS. 4-8 disclose a second embodiment of the invention which is generally designated by the reference 52. In this embodiment, most of the components are the same as described with reference to the embodiment illustrated in FIGS. 1-3; however, a fan drying unit 54 is now mounted in a top surface 56 of the container 12. The fan drying unit 54 is designed to be used in those situations where a disposable plastic bag is not available. The fan 54 can be powered by a single battery 58 and is operated by an on/off switch 60 in a conventional manner and as particularly illustrated in FIG. 7. The battery 58 may be retained within a battery holding compartment 62 molded into a rear end portion 64 of the container 12, and a plurality of screen covered air intake slots 66 can be molded into a bottom portion 68 of the container to serve as a means of allowing air to be drawn into the container and upwardly through the fan 54.

The manner of operation of the second embodiment of the invention is identical to that of the first embodiment 10 with the exception that no plastic disposal bag is utilized and the fan 54 operates to dry the fecal matter to facilitate its later removal from the container. More specifically, when the fan 54 is operated by the battery 58, air is drawn inwardly through the plurality of air intake slots 66, moves through the fecal matter so as to affect a drying thereof, and is discharged through the topmost position screen covered fan 54.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved cat litter box cleaner comprising:
   container means,
   shovel means for collecting litter and sifting said litter through at least open slot formed in said shovel means, thereby to remove fecal matter from said litter;
   guide means for directing said fecal matter to a movable closure pivotally mounted on said container means; and
   opening means for pivotally opening said movable closure, whereby said fecal matter may be collected within said container means, said opening means comprising a slidably movable button abuttable against an arm, said arm being pivotally attached to a retention ring means mounted on said container means, said arm being abuttable against said closure so as to selectively force an opening of said closure to facilitate a collecting of fecal matter.

2. The new and improved cat box litter cleaner as described in claim 1, wherein said closure comprises a spring loaded door mounted on said container means.

3. The new and improved cat box litter cleaner as described in claim 2, and further including a disposable bag selectively positionable within said container means.

4. The new and improved cat box litter cleaner as described in claim 2, and further including a fecal matter drying means mounted to said container means.

5. The new and improved cat box litter cleaner as described in claim 4, wherein said fecal matter drying means comprises a fan assembly for facilitating a flow of air over said fecal matter to accomplish a drying thereof.

6. A new and improved cat litter box cleaner comprising:
   container means,
   a retainer ring, said container means being removably connectable to said retainer ring,
   shovel means for collecting litter and sifting said litter through at least one slot formed in said shovel means, thereby to separate fecal matter from said litter, said shovel means being supported by said retainer ring,
   closure means movably mounted on said retainer ring and adapted in a first position to prevent access to said container means and in a second selectively operable position to permit access to said container means, and
   selectively operable means on said retainer ring coupled to said closure means for movably operating said closure means between said first position and said second position whereby said fecal matter may be collected within said container means, and wherein said shovel means is removably connectable to said retainer ring.

* * * * *